United States Patent
Shafer

(10) Patent No.: US 12,121,072 B2
(45) Date of Patent: *Oct. 22, 2024

(54) ACCESSORY FOR ELECTRONIC CIGARETTE

(71) Applicant: Altria Client Services LLC, Richmond, VA (US)

(72) Inventor: Kenneth H. Shafer, Fountain Valley, CA (US)

(73) Assignee: Altria Client Services LLC, Richmond, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/316,515

(22) Filed: May 12, 2023

(65) Prior Publication Data

US 2023/0276857 A1 Sep. 7, 2023

Related U.S. Application Data

(63) Continuation of application No. 17/353,052, filed on Jun. 21, 2021, now Pat. No. 11,684,089, which is a continuation of application No. 14/205,813, filed on Mar. 12, 2014, now Pat. No. 11,058,154.

(60) Provisional application No. 61/800,026, filed on Mar. 15, 2013.

(51) Int. Cl.
*A24F 40/51* (2020.01)
*A24F 40/60* (2020.01)
*G01N 21/17* (2006.01)

(52) U.S. Cl.
CPC .............. *A24F 40/51* (2020.01); *A24F 40/60* (2020.01); *G01N 21/17* (2013.01)

(58) Field of Classification Search
CPC .......... A24F 40/51; A24F 40/60; G01N 21/17
See application file for complete search history.

(56) References Cited

U.S. PATENT DOCUMENTS

| | | | |
|---|---|---|---|
| 4,771,381 A | 9/1988 | Norman et al. | |
| 5,902,501 A | 5/1999 | Nunnally et al. | |
| 9,560,883 B2 * | 2/2017 | Hawes | A24F 40/46 |

(Continued)

FOREIGN PATENT DOCUMENTS

| | | |
|---|---|---|
| AU | 2002310614 B2 | 1/2005 |
| CN | 1719989 A | 1/2006 |

(Continued)

OTHER PUBLICATIONS

International Search Report and Written Opinion dated Nov. 10, 2014.

(Continued)

*Primary Examiner* — Michael J Dalbo
*Assistant Examiner* — Kaleria Knox
(74) *Attorney, Agent, or Firm* — Harness, Dickey & Pierce, P.L.C.

(57) ABSTRACT

An exemplary accessory for an electronic smoking article includes a hollow body having inner and outer surfaces and a sensor in the body. The sensor is configured to detect an emission of the electronic smoking article. A processor is embedded in the body, where the processor is configured to generate smoking topography data based on the emission. A display generates an output based on the smoking topography data provided by the processor.

17 Claims, 3 Drawing Sheets

(56) References Cited

U.S. PATENT DOCUMENTS

| | | | |
|---|---|---|---|
| 2003/0226837 A1* | 12/2003 | Blake | A24F 40/50 219/535 |
| 2009/0100983 A1 | 4/2009 | DiClaudio | |
| 2011/0036346 A1 | 2/2011 | Cohen et al. | |
| 2011/0265806 A1* | 11/2011 | Alarcon | A24F 40/485 131/273 |
| 2012/0048266 A1* | 3/2012 | Alelov | A61M 15/06 128/203.14 |
| 2012/0111347 A1 | 5/2012 | Hon | |
| 2012/0291791 A1 | 11/2012 | Pradeep | |
| 2014/0230835 A1 | 8/2014 | Saliman | |
| 2014/0278258 A1* | 9/2014 | Shafer | A24F 40/60 702/189 |

FOREIGN PATENT DOCUMENTS

| | | | |
|---|---|---|---|
| CN | 102655773 A | | 9/2012 |
| WO | WO-02/098245 A1 | | 12/2002 |
| WO | WO-2004047570 A2 | | 6/2004 |

OTHER PUBLICATIONS

Office Action for corresponding Chinese Office Action application No. 201480019839.8 dated Apr. 25, 2017 and English translation thereof.

Second Chinese Office Action for corresponding Chinese Application No. 20140019839.8 dated Jan. 17, 2018 and English translation thereof.

Third Chinese Office Action for corresponding Chinese Application No. 201480019839.8 dated Aug. 10, 2018 and English translation thereof.

Substantive Examination Report for corresponding Malaysian Application No. PI 2015002334 dated Sep. 14, 2018.

Chinese Decision of Rejection for corresponding Application No. 201480019839.8 dated Mar. 12, 2019, English translation thereof.

Indian Examination Report for corresponding Application No. 5563/CHENP/2015, dated Aug. 20, 2019, English translation thereof.

* cited by examiner

ACCESSORY FOR ELECTRONIC CIGARETTE

RELATED APPLICATION

This application is a continuation of U.S. application Ser. No. 17/353,052, filed Jun. 21, 2021, which is a continuation of U.S. application Ser. No. 14/205,813, filed Mar. 12, 2014, which claims priority under 35 U.S.C. § 119(e) to U.S. Application No. 61/800,026 filed on Mar. 15, 2013, the content of each of which is hereby incorporated by reference in its entirety.

FIELD

This disclosure relates to an electronic smoking article, and particularly to an accessory for obtaining smoking tomography data that attaches to an e-cigarette housing.
Working Environment Electronic smoking articles including electronic cigarettes or e-cigarettes may use a liquid as the aerosol-forming substrate and are capable of reducing second-hand smoke, while permitting a smoker to selectively suspend and reinitiate smoking. These devices can include a cartridge that contains the aerosol forming substrate. The substrate can come in various forms such as a solid or liquid and releases an aerosol gas to the smoker following the appropriate application of heat through a heating element. The heating element is powered through a power supply, such as a battery. The heating of the aerosol substrate is triggered via an e-puff sequence initiated by the user.

Various systems have been described which collect data based on the smoking topography of the individual. For example, US 2012/0291791 discloses a nicotine delivery reduction system having a breath monitor that tracks nicotine solution usage, usage frequency, and breath characteristics. A flow controller is used to regulate the levels of nicotine or nicotine solution provided to a user based on monitored user habits and characteristics. US 2011/0036346 discloses a personal inhalation device that includes a logic circuit that can be programmed to limit an amount of nicotine media atomized during a puff, and the minimum time interval between activations of the atomizing device, for example. The logic circuit can be programmed to retain device operation information such as puffs per day, puffs per minute, cartridges used, average use, and other usage information as desired. The collected data is stored in memory and can be later downloaded to an external device.

US 2011/0265806 is directed to an electronic smoking article that includes a controller that carries out various operations on the device and a memory that stores instructions to be executed by the controller and may store usage information, product information, and user information. For example, the usage information can include a smoking liquid level in the container, how many containers have been consumed, and an amount of nicotine consumed. The product information can include a model number and serial number; and the user information can include name, sex, age, address, job, educational background, interests, and hobbies among the information. This data can be stored in memory until downloaded through any suitable wired or wireless connection.

SUMMARY

The exemplary embodiments of the present disclosure provide an accessory that can be mounted on or attached to the outer housing of an electronic smoking article and provide a measure of smoking topography data. This accessory can be advantageous in situations where an electronic smoking article does not have a manner of monitoring smoking topography data for a smoking event. The accessory can be configured to be non-intrusive and provide minimal additional weight or size to the electronic smoking article to which it is mounted or attached. The accessory can include a sensor that detects an electromagnetic or light emission of the electronic smoking article during a smoking event (e.g., puff event) of a user. Based on the detected emission a processor can measure the length (e.g., time interval, duration in time) of the smoking event, the number of smoking events, or other desired properties of the smoking event as desired. The accessory can include a display that outputs an alphanumeric representation of the measurements.

An exemplary first embodiment is directed to an apparatus configured to be detachably mounted on an outer surface of a housing of an electronic smoking article, the apparatus comprising: a hollow body having inner and outer surfaces; a sensor embedded between the inner and outer surfaces of the body, and configured to detect an emission of the electronic smoking article; a processor embedded between the inner and outer surfaces of the body, the processor being configured to generate smoking topography data based on the emission; and a display that generates an output based on the smoking topography data provided by the processor.

An exemplary second embodiment is directed to a method of generating smoking topography data from an electronic smoking article, comprising: detecting a emission of the smoking article; measuring at least one of a time length of the emission and a time length between emissions; and outputting the measurement to a display device.

BRIEF DESCRIPTION OF THE DRAWINGS

Exemplary embodiments of the present disclosure are described in more detail with reference to the attached drawings.

DETAILED DESCRIPTION

Figure 1:
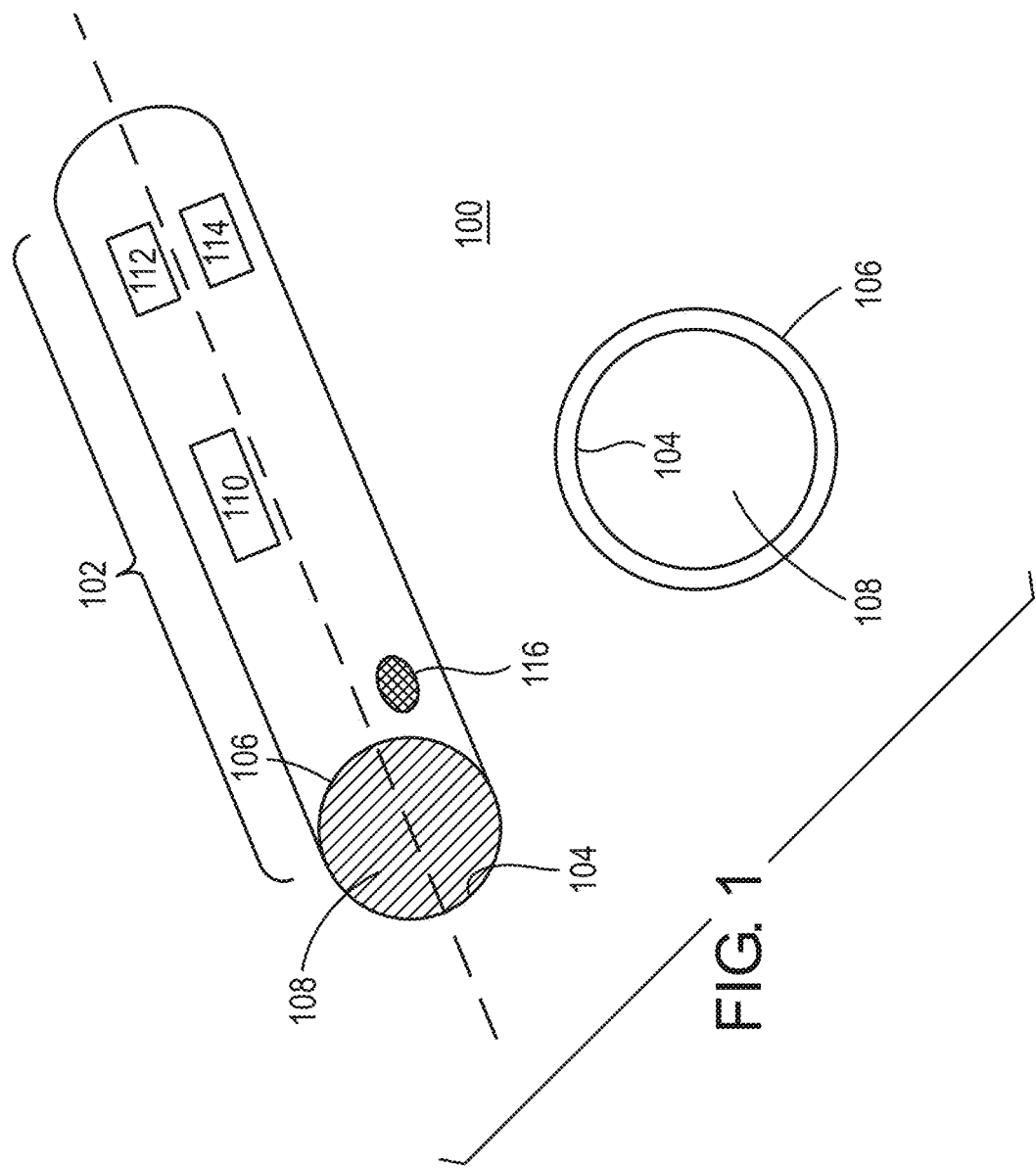
FIG. 1 illustrates an electronic smoking article accessory in accordance with an exemplary embodiment of the present disclosure.

FIG. 1 illustrates an electronic smoking article accessory 100 in accordance with an exemplary embodiment of the present disclosure. The accessory 100 includes a hollow cylindrical body 102 having inner and outer surfaces 104, 106. The body 102 can be a sleeve formed of a durable and flexible material, which can allow it to be slidably and removably mounted on an outer housing of an electronic smoking article. In an exemplary embodiment, the body 102 can be formed of materials such as Kevlar®, or other high strength fabrics. However, other suitable materials for the body can include, for example, rubber, plastics, metals, or any suitable combination thereof, that will allow for a tight and secure fit of the accessory 100 around the housing of the electronic smoking article. The body 102 has a hollow opening 108 that is of a sufficient diameter to receive and encase (e.g., surround or envelop) an electronic smoking article. In an exemplary embodiment, the accessory 100 is made of a durable foam-like material and has hollow opening 108 smaller than a diameter of the electronic smoking article, such that the body 102 can be tightly or securely fit to the housing of the electronic smoking article.

As shown in FIG. 1, the accessory 100 can include a display 110 disposed on an outer surface 106 of the body 102. The display 110 include a liquid crystal display configured to operate in a low voltage range of 1.5-2V. In an exemplary embodiment, the accessory 100 can also have an LED 114 and a speaker 116 disposed on the outer surface 106 to provide auditory and visual indications to the user regarding an operational or functional status of the accessory 100 or regarding a smoking topography.

Figure 2:
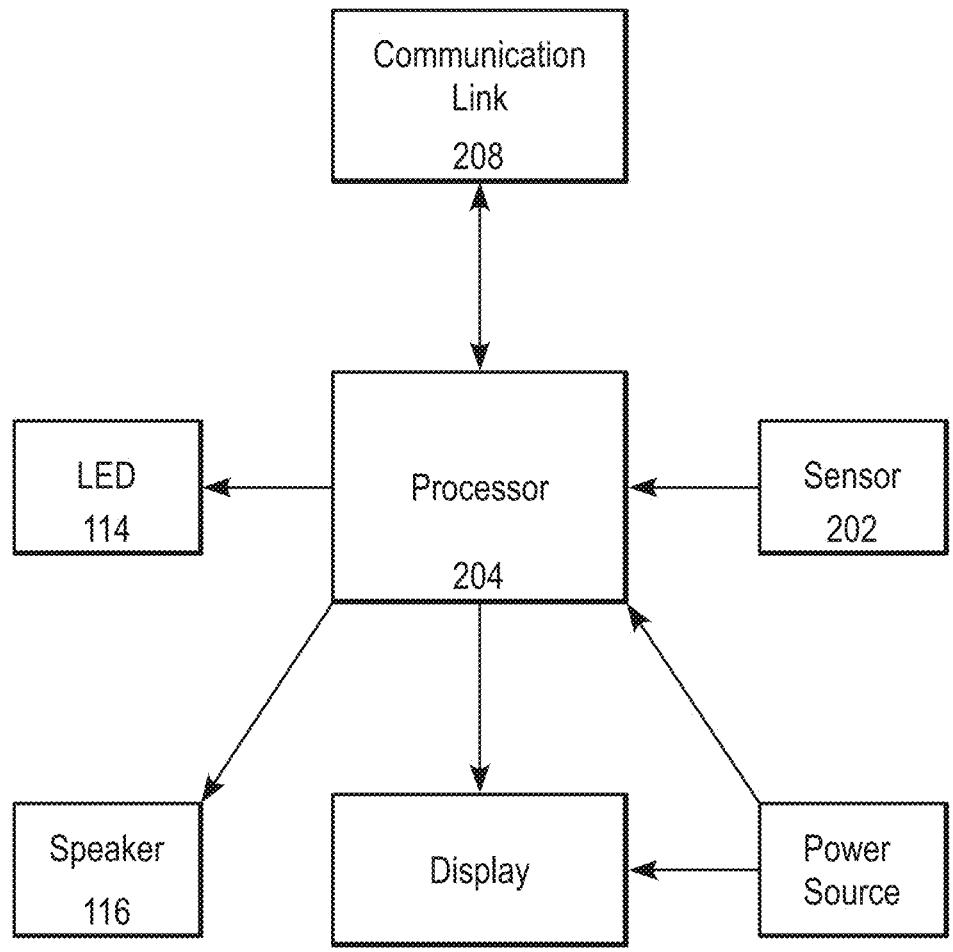
FIG. 2 illustrates electronic circuitry of an electronic smoking article accessory in accordance with an exemplary embodiment of the present disclosure.

FIG. 2 illustrates an electronic circuit 200 of an electronic smoking article accessory in accordance with an exemplary embodiment of the present disclosure. As shown in FIG. 2, the electronic circuit 200 of the accessory 100 includes a sensor 202, a processor 204, the display 110, and the power source 112. Each of these components can be fully or partially embedded between the inner and outer surfaces 104, 106 of the accessory body 102.

The sensor 202 can be used to detect an emission of the electronic smoking article. During a smoking event, various components of an electronic smoking article, such as a power supply, light emitting diode (LED), heating element, signal generator can emit an electromagnetic field or signal. The sensor can be configured to detect when the field or signal is emitted and determine that a smoking event has occurred. For example, in an exemplary embodiment an electronic smoking article can have an LED indicator that emits light each time and for the duration of a puff event. The sensor 202 can therefore, be disposed on, or embedded in the body 102 of the accessory 100 to detect the light emitted by the LED. In other exemplary embodiments, the sensor 202 can be tuned to detect an emission of a specified frequency, such that when this frequency is detected the accessory 100 can collect topography data.

The processor 204 can be connected to receive a signal of the sensor 202. The processor 204 can be any type of low-voltage programmable microcontroller or processor. The processor 204 can be configured with various registers (REG), timers (TMR), or counters (CNT) for measuring and collecting the topography data. In an exemplary embodiment, the processor 204 can be configured to generate an interrupt upon a change in the output of the sensor 202. This change in output indicates whether a smoking event (e.g., puff start event or puff release event) has occurred in the electronic smoking article. The interrupts can be used to start and stop various timers or counters, as desired, whose values can be used as the puff count, puff length, or any other desired smoking topography measurement as desired. The processor 204 can be configured to include memory for storing configuration data as well as data stored in the registers, timers, and counters, as desired.

The display 110 is connected to receive an output signal from the processor 204. The output signal can include data values associated with the measured puff count and puff length, for example. The display 110 can be implemented as a liquid crystal display or other suitable low-voltage (e.g., no more than 1.5-2V) display output type as desired.

The power source 112 can be any of a number of known low-voltage power supplies. For example, as already discussed, the power source 112 can include a solar or photovoltaic cell that generates power based on captured light. As shown in FIG. 1, the solar cells can be disposed on an outer surface 106 of the accessory body 102. In an exemplary embodiment, the power source can be implemented as one or more batteries, such as an alkaline cell or variant that individually provides up to 1.5V. Any number of cells can be combined so that sufficient power can be supplied to the processor 204 during operation.

In an exemplary embodiment, the accessory 100 can also include at least one LED 114 and a speaker 116 that provide aural and visual indications to a user regarding an operational or functional status of the accessory 100, and/or an indication of specified user behavior. For example, the LED 114 can be configured to emit light of a specified color or in a specified flash sequence according to whether a battery charge is low, a malfunction has occurred in the processor, the accessory is off or in a sleep mode, puff status, etc. Similarly, the speaker 116 can be used to output various tones for indicating, for example, a battery status, puff status, power on or off event, etc.

In an exemplary embodiment, the accessory 100 can include a communications link 206, which can be configured to provide a bi-directional wired or wireless connection to an external device. In a wired configuration, the communication link 206 can be a Universal Serial Bus (USB), a Recommended Standard 232 (RS-232) family of standards. The wired configuration can provide bi-directional communication and also power up to 5V DC. In a wireless configuration, the communications link 206 can be implemented as Bluetooth, Infrared Data Association (IrDA), radio-frequency (RF), cellular, or other suitable wireless communication standard as desired. The communication link 206 is connected to the processor 204 to transfer smoking topography data to the external device and/or the transfer configuration data to the processor 204. The communication link 206 can be configured to allow for bidirectional communication of user data, control data, and/or configuration data between the processor 204 and an external device or processor. With regard to the configuration and control data, the processor 204 can be configured to be specially programmed and/or configured to execute a process recorded on a non-transitory computer-readable recording medium, such as a hard disk drive, flash memory, optical memory, or any other type of non-volatile memory as desired. The executable data for the process being transferrable or transferred to the processor 204 via the communication link 206.

Figure 3:
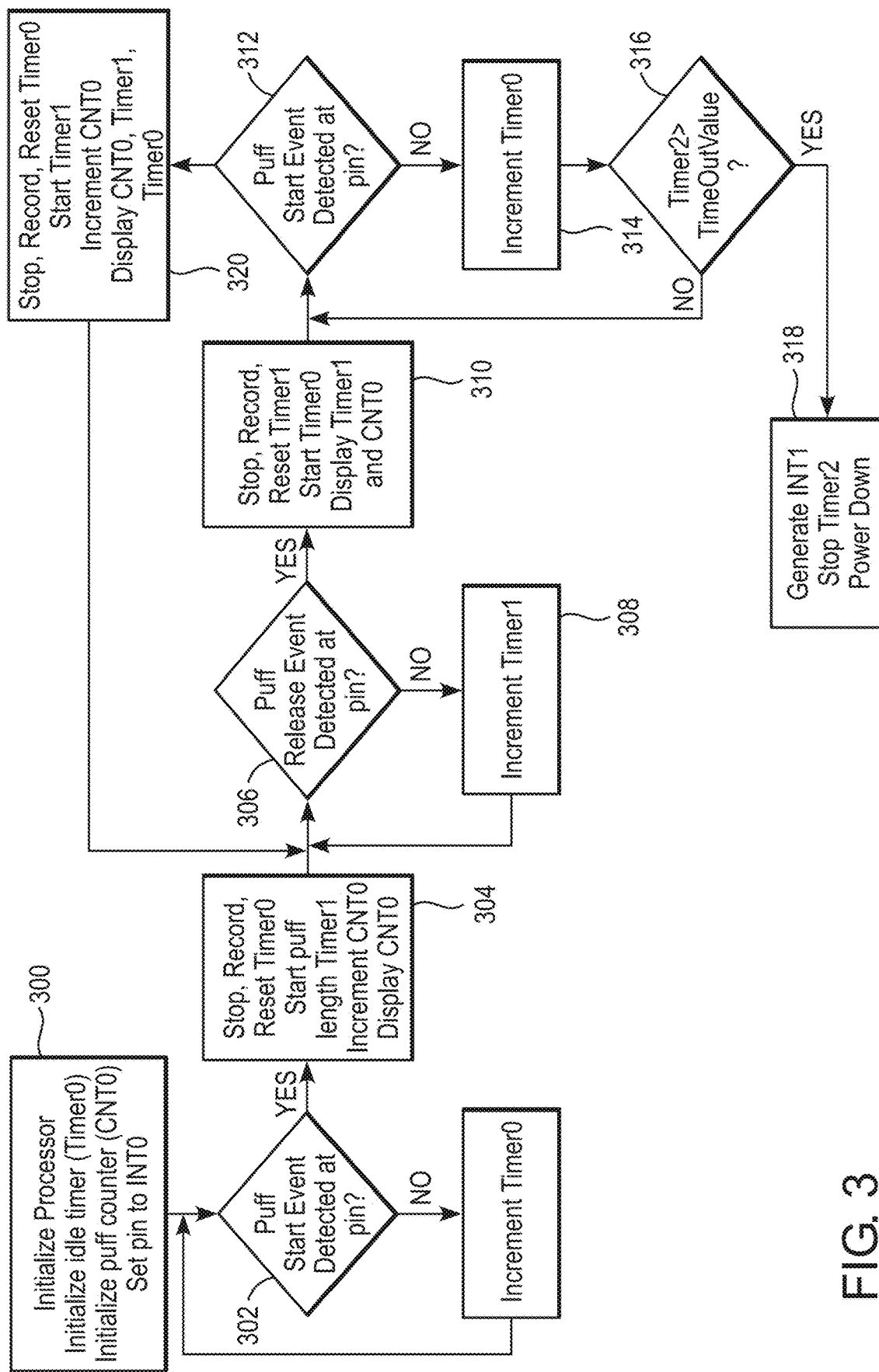
FIG. 3 illustrates a method for generating smoking topography data in an electronic smoking article accessory in accordance with an exemplary embodiment of the present disclosure.

FIG. 3 illustrates a method for generating smoking topography data in an electronic smoking article accessory in accordance with an exemplary embodiment of the present disclosure. As shown in FIG. 3, at power up or system reset (step 300), the processor initializes an idle timer (Timer0) to measure the length of a non-smoking time segment. At power up, the processor 204 assigns a pin as an interrupt (INT0) to the output of the sensor 202. At step 302, the processor 204 monitors the sensor output to determine whether a puff start event has occurred. When the sensor outputs a high signal, the interrupt INT0 is generated. As shown at step 304, the idle timer (Timer0) is stopped and the puff length timer (Timer1) is started and the puff count counter (CNT0) is incremented. The values of Timer1 and CNT0 are output to display 110 and can remain as an output until the accessory 100 is powered down or reset. At step 306, the processor 204 again monitors the sensor output to determine whether a puff release event has occurred. If the sensor output remains high, then no puff release event has occurred and, as shown at step 308, the Timer1 is incremented. The values of Timer1 and CNT0 are output to the display 110. When, at step 310, the puff release event is detected, then the interrupt INT0 is again generated, the Timer1 is stopped and the non-smoking interval timer or idle timer (Timer0) is started. The values of Timer0, Timer1, and CNT0 are output to the display. At step 312, the processor 204 monitors the output of the sensor for the next puff start event. If no puff start event is detected then the Timer0 is incremented (step 314). At step 316, the processor 204 determines whether the Timer0 has exceeded a specified value (e.g., TimeOutValue), and if so, the processor 204 generates an interrupt (INT1) to stop the Timer0 and power down (step 318). If however, the Timer0 has not exceeded a specified value then processing returns to step 312.

At step 312, if a next puff start event is detected (step 320), the Timer0 is stopped and reset, the puff count counter (CNT1) is incremented, and the puff length timer (Timer1) is started. The values of Timer0, Timer1, and CNT0 are output to the display 110. Processing continues at step 306.

The teachings herein are applicable to all forms of electronic smoking articles, such as electronic cigarettes, cigars, pipes, hookahs, and other suitable forms of electronic smoking articles as desired, regardless of their size and shape.

In an exemplary embodiment, during the exemplary method described above the display 110 can be used to output any of a number of status messages to the user.

While the disclosure has been illustrated and described in detail in the drawings and foregoing description, such illustration and description are to be considered illustrative or exemplary and not restrictive; the disclosure is not limited to the disclosed exemplary embodiments. Other variations to the disclosed exemplary embodiments can be understood and effected by those skilled in the art and practicing the claimed disclosure, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference symbols in the claims should not be construed as limiting the scope.

Thus, it will be appreciated by those skilled in the art that the present disclosure can be embodied in other specific forms without departing from the spirit or essential characteristics thereof. The presently disclosed embodiments are therefore considered in all respects to be illustrative and not restricted. The scope of the disclosure is indicated by the appended claims rather than the foregoing description and all changes that come within the meaning and range and equivalence thereof are intended to be embraced therein.

What is claimed is:

1. An apparatus configured to be detachably mounted on an outer surface of a housing of an electronic smoking article, the apparatus comprising:
a hollow body having an inner surface and an outer surface;
a sensor configured to detect an emission of the electronic smoking article; and
a processor between the inner surface and the outer surface of the hollow body, the processor configured to generate smoking topography data based on the emission.

2. The apparatus of claim 1, wherein the sensor is embedded in a circuit of the processor.

3. The apparatus of claim 2, further comprising:
a speaker on the outer surface of the hollow body.

4. The apparatus of claim 1, wherein the sensor is configured to detect an electromagnetic field, a signal emitted by a heating element of the electronic smoking article, or both an electromagnetic field and a signal emitted by a heating element of the electronic smoking article.

5. The apparatus of claim 1, wherein the sensor is configured to detect a light emitted by a light source of the electronic smoking article.

6. The apparatus of claim 1, wherein the processor is configured to determine a puff count, a puff length, or both a puff count and a puff length upon detection of the emission.

7. The apparatus of claim 1, further comprising:
a display on the outer surface of the hollow body.

8. The apparatus of claim 7, wherein the display is a liquid crystal display configured to generate an alphanumeric output.

9. The apparatus of claim 7, wherein the display is a liquid crystal display configured to generate an alphanumeric output of puff count, a puff length, or both a puff count and a puff length.

10. The apparatus of claim 1, further comprising:
a power source between the inner surface and the outer surface of the hollow body, the power source configured to provide power to the processor.

11. The apparatus of claim 1, further comprising:
a memory configured to store the smoking topography data generated by the processor.

12. The apparatus of claim 1, wherein the processor is configured to
generate the smoking topography data based on the emission, and
power down the apparatus in response to the sensor detecting an absence of a subsequent emission.

13. The apparatus of claim 1, wherein the processor is configured to determine a puff count, a pull length, or both a puff count and a puff length upon detection of the emission of the electronic smoking article.

14. The apparatus of claim 13, wherein the processor is configured to reset a puff length timer, start an idle timer, and provide a value from the idle timer on a display upon detecting an end of the emission.

15. The apparatus of claim 14, wherein the processor is configured to power down the apparatus upon the idle timer exceeding a threshold.

16. The apparatus of claim 1, further comprising:
a communication link configured to be communicatively coupled to the processor, the communication link configured to communicate with an external device.

17. The apparatus of claim 16, wherein the communication link is configured to transfer the smoking topography data to the external device.

* * * * *